Oct. 21, 1958 M. R. SPARLIN 2,856,943
CRUTCH CONSTRUCTION
Filed March 29, 1955 2 Sheets-Sheet 1
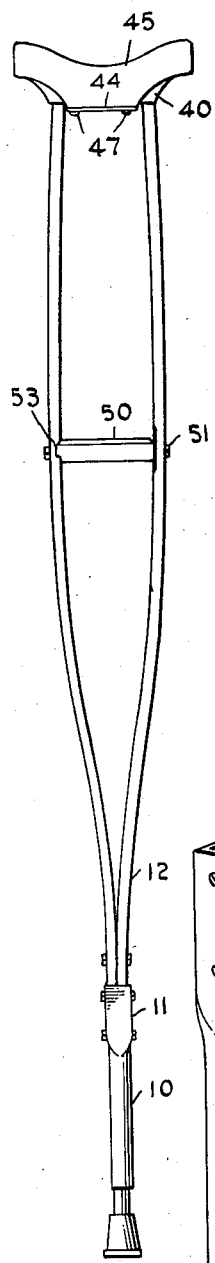
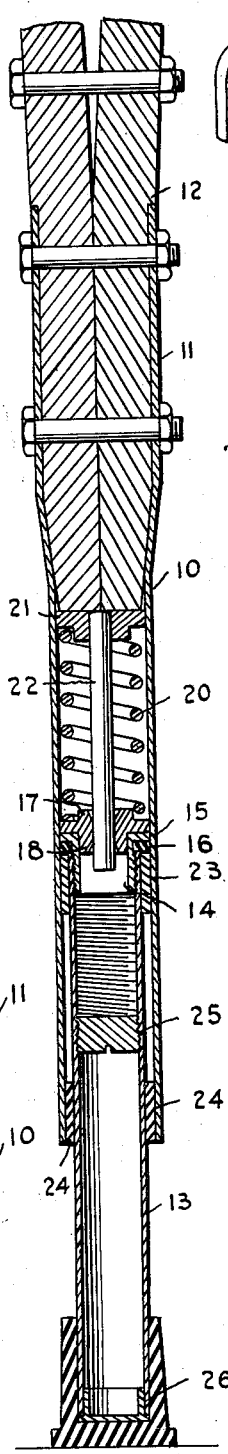
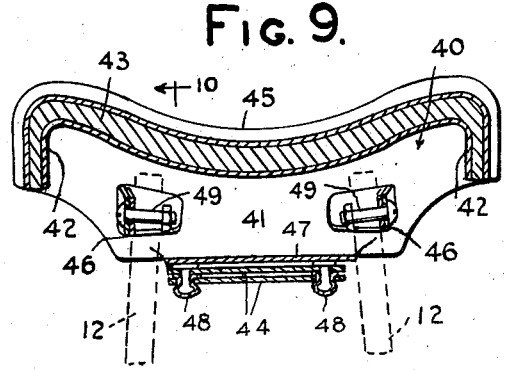
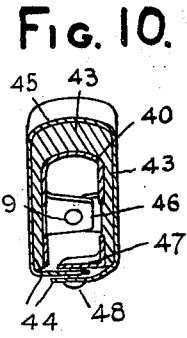
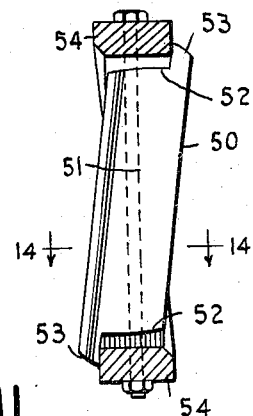
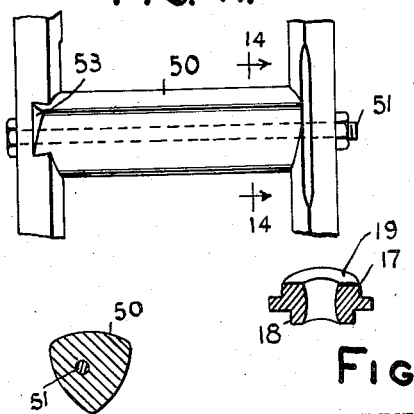
INVENTOR
Max R. Sparlin
BY
Holcombe, Wetherill & Brisebois
ATTORNEYS Oct. 21, 1958   M. R. SPARLIN   2,856,943
CRUTCH CONSTRUCTION
Filed March 29, 1955   2 Sheets-Sheet 2
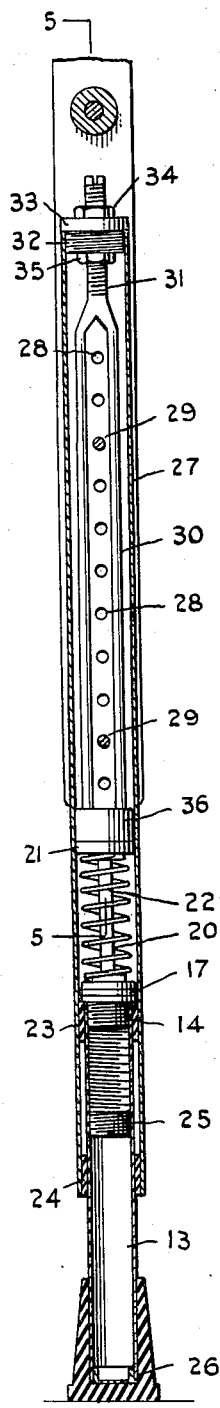
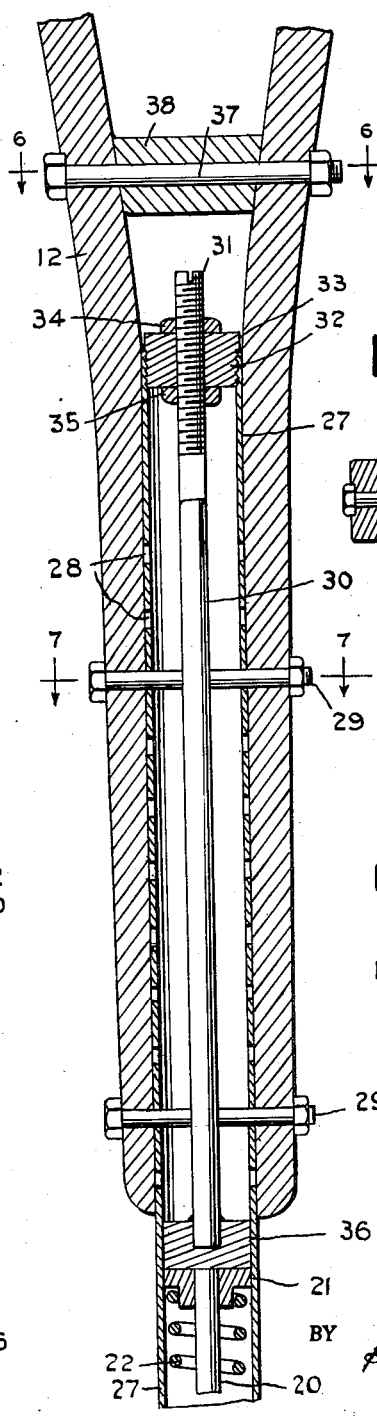
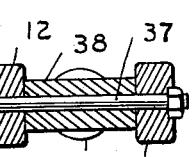
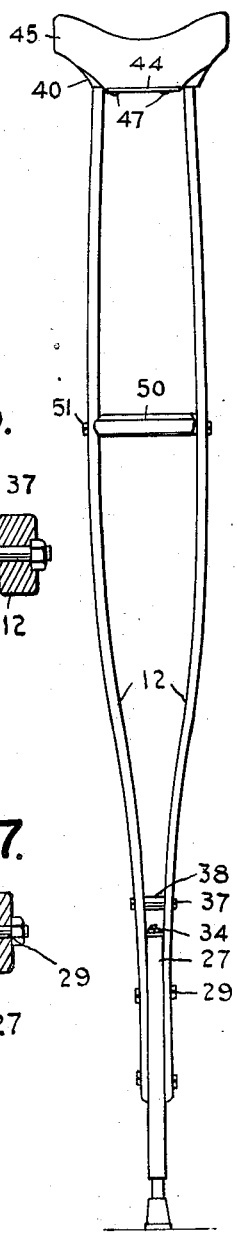
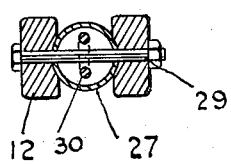
INVENTOR
MAX R. SPARLIN
BY Holcombe, Wetherill & Brisebois
ATTORNEYS United States Patent Office 2,856,943
Patented Oct. 21, 1958

1

2,856,943

CRUTCH CONSTRUCTION

Max R. Sparlin, Miami, Okla.

Application March 29, 1955, Serial No. 497,678

10 Claims. (Cl. 135—49)

The invention relates to construction of crutches to provide for greater comfort and more particularly to a shock absorbing device to be attached to the lower end of a crutch, and to the construction of the arm rests and hand pieces of crutches to facilitate their use.

Persons who must use crutches permanently, or over a long period of time, are subject to considerable discomfort and annoyance from the limitations of the conventional crutch, and this invention is for their benefit.

The three separate units of the present invention, the base shock absorber, the underarm unit, and the unique shape and positioning of the handpiece, when used together, provide optimum comfort which has long been sought. Furthermore, a crutch constructed in accordance with the present invention is light in weight, and neat and trim in appearance while affording full support and at the same time permitting more freedom of action by the crutch user.

One object of the present invention is to provide a shock absorbing device adapted for use in any standard type of crutch.

Another object of the invention is to provide a cushioned rest for the under-arm of the crutch user which will not cause pressure upon vital nerves and blood vessels of the arm pit, the soft durometer of the cushion being adapted to cooperate with the base shock absorber mechanism to absorb the major portion of the shock caused by use of the crutch, it being a purpose of the invention, by using the two devices together to offset the contact jar at both ends of the crutch simultaneously by providing an underarm cushion of sufficient resiliency to reciprocate with the action of the base shock absorber.

Another object of the invention is to provide a hand piece installed so as to allow for a more normal position of the hands and arms of the crutch user, and thus for a more stable distribution of the weight of persons who carry the major portion of their weight on their hands. To this end, a handpiece of more or less triangular shape is preferred, with the three sides somewhat rounded convexly. Both ends of each handpiece are angularly notched on opposite sides, to provide a lip or flange extending out over the outside of the upright at either end on opposite sides, so that the handpiece is set in an obliquely angular position horizontally, and in addition the flanges prevent the handpiece from rolling on the pin or bolt which is installed through the uprights and handle in the customary straight position.

The construction, functioning and arrangement of a preferred form of the invention are hereinafter described in detail and its novel features are particularly set forth in the claims and by reference to the accompanying drawings, in which:

Figure 1 is a side elevation showing a crutch embodying one form of my invention;

Figure 2 is a longitudinal sectional view in an axial plane through the lower portion of the crutch shown in Figure 1;

2

Figure 3 is a side elevation of a crutch embodying an alternative form of my invention;

Figure 4 is a longitudinal sectional view in an axial plane through the lower portion of the crutch shown in Figure 3;

Figure 5 is a longitudinal sectional view in a plane transverse to that of Figure 4 of a portion of the lower portion of the crutch, on the line 5—5 of Figure 4;

Figure 6 is a cross section on the line 6—6 of Figure 5;

Figure 7 is a cross section on the line 7—7 of Figure 5;

Figure 8 is a perspective view of the lower portion of the crutch shown in Figure 1;

Figure 9 is a vertical mid-cross sectional view of the arm rest unit of the crutch;

Figure 10 is a transverse cross section of the arm rest on the line 10—10 of Figure 9;

Figure 11 is a side view of the hand piece of the right crutch;

Figure 12 is a horizontal cross section giving a view of the hand piece of the left crutch;

Figure 13 is a horizontal cross section of the bearing shown in Figure 2; and

Figure 14 is a cross section of a hand piece on the lines 14—14 of Figures 11 and 12.

Referring to Figures 1, 2 and 8, the shock absorbing mechanism comprises a round tubular housing 10 having a square formation in the upper portion 11 to receive the divided uprights 12 which have been bound or clamped together in any suitable manner for insertion in the member 11; a round tubular shaft 13 having the upper portion interiorly threaded to an appropriate depth to receive a threaded, screw-in, flanged collar 14, adapted to screw into the shaft 13, the flange 15 having an outer dimension slightly larger than the dimension of the shaft 13; a silencing washer 16 of suitable material, preferably rubber, for insertion between the flange 15 of the collar 14 and the rim of the shaft 13, the outer dimension of the washer 16 being the same as that of the flange 15; a hub-like, flanged, free-floating bearing 17, preferably of permanent, self-lubricating material, having a lower boss 18 adapted to ride freely inside the inner dimension of the screw-in collar 14, and an upper boss 19, adapted to fit tightly inside the inner dimension of one end of a compression coil spring 20, the spring having a suitable strength for the user of the crutch; a spring cap 21 and guide stem 22, the outer dimension of the spring cap 21 being adapted to fit closely inside the inner dimension of the tubular housing 10 and having a lower boss adapted to fit closely inside the inner dimension of the end of the coil spring 20 opposite the bearing 17. The guide stem 22 is preferably of sufficient length to extend through the bearing 17 at the top of the shaft 13, and thus keep the coil spring 20 centrally stabilized so that it will not touch the inner walls of the housing 10 when the spring cap 21 and the guide stem 22 and the bearing 17 are in position. The guide stem 22 passing through the central bore of the bearing 17 is centrally stabilized and the bearing 17 is thus adapted to permit free and silent rotation of the collar 14, carrying the shaft 13 independent of the coil spring 20.

Another function of the spring cap guide and stem is to keep the upper end of the spring at true right angle to its axial length, even in the event that the ends of the inserted uprights against which it rests should not be plumb.

Press installed in the lower end of the housing 10 are bearings 23 and 24 of permanent, self-lubricating material, preferably a dry lubricant, to permit easy and noiseless action of the plunger shaft 13 inside the housing 10 when the crutch is in use.

A threaded stop plug 25 may be installed inside the threaded portion of the shaft 13; should the coil spring 20 fail, the plug 25 will cooperate with the guide stem 22 and the spring cap 21 to lock the mechanism. The bottom of the shaft 13 may be furnished with a plug 26 of any suitable material to prevent cutting through the flexible crutch tip.

In Figures 4 and 5 is shown an alternate form of construction of the shock absorbing device which provides for vertical adjustment of the length of the crutch and of the tension of the spring so that it may be adapted for users of different heights and weights. This alternate construction comprises a complete self-contained unit, housed in a straight round housing 27 having no external protrusions but provided with oppositely positioned holes 28 for installing pins or bolts 29; a divided tension control stem 30 in the housing converges to a single threaded portion 31 at the top, the purpose of the divided stem being to permit transverse insertion of the securing pins or bolts 29 through the holes 28 for variable height adjustment; a threaded, screw-in cap 32 is provided for the housing 27 through which the control stem 30 protrudes. The collar 33, of the cap 32, is of the same outer dimension as the housing 27; lock nuts 34 and 35 are provided above and below the screw-in cap 32 for securing the tension adjustment; a base 36 is secured to the lower end of the divided control stem, being made preferably of composition material. To adjust the height of the crutch, the pins or bolts 29 may be withdrawn; if it is then desired to loosen or tighten the tension of the coil spring 20, the tension control stem may be turned to depress or raise the base 36 and thus tighten or loosen the tension of the coil spring 20, the lock nuts 34 and 35 may be turned to secure the adjustment, the housing 27 may be raised or lowered to increase or decrease the height of the crutch as desired and the pins or bolts 29 may be replaced through the appropriate holes 28 in the housing 27.

As shown in Figures 5 and 6, the uprights of the crutch may be braced by a pin or bolt 37 inserted through a cross piece 38 between the uprights of the crutch.

It is understood that the device may be used with an all-metal crutch as well as with a crutch having uprights of wood or other suitable materials. It may also be slidingly installed inside the single tubular upright type of crutch. For this type of application, the outer crutch tube may be drilled for the variable height adjustment and any well known spring type catch installed. With the spring tension adjustment control through the upper portion and top of the tube of the self-contained unit, it is adjustable to the height and weight of the individual user.

In Figures 1 and 3 is shown the specially designed arm rest unit, and Figures 9 and 10 show the unit in cross section from end to end and transversely. The unit is comprised of a base formation 40 of any desirable material, but preferably of sheet metal, having a lengthwise concave transversely convex top, long, vertically parallel side skirts 41 and much shorter, vertically parallel ends 42, a prefabricated underarm form-fitting resilient cushion 43, preferably of foam rubber conforming to and removably covering the top and extending the entire vertical depth of the side skirts and ends of the base formation 40 as shown in Figure 10; a form-fitting hood 45, preferably of plastic sheet material, having the same exterior contour and dimensions as the cushion 43, and having flaps 44, secured by snaps 48 or other suitable means for fastening the hood beneath the base formation 40 to hold the cushion 43 in place while permitting circulation of air under and through the resilient cushion. There are also two interior flanges 46 for receiving the bolts 49 which attach the metal base formation to the uprights of a wooden crutch, and a bottom flange 47 to provide resistance when snap-type fasteners 48 are used for securing the hood 45.

The vertically parallel ends and sides of the arm rest, cushion and hood cover enable the cushion to be slipped down over the base without exhausting its resiliency through stretching or distortion. In addition they enable the plastic hood cover to be slipped down over and around the cushion without stretching or distortion. With the hood cover in position all of the parts of the arm rest lie snug and resilient to provide a resilient padding between the underarm of the user and the crutch of much softer character than is possible without this protection, which padding cooperates with the shock absorbing mechanism at the base of the crutch to offset and absorb the shock incident to contact between the crutch and the floor or other hard surfaces. The soft resilient padding, being extended to the full vertical depth of the arm rest, cushions the inner arm and chest of the user and eliminates the customary hard bulge of conventional forms of attached padding thus avoiding interference with the circulation of the user.

Figures 11 and 12 illustrate a handpiece uniquely positioned on the horizontal plane in relation to the two uprights and to the headpiece of the crutch.

The handpiece 50 is somewhat triangular in shape in cross section as shown in Figure 14 with the three sides slightly rounded convexly. Both ends of the handpiece are angularly notched, to an equal extent but on opposite sides, so as to provide flanges or lips 53 which, in assembled position, extend out over the upright to which they are attached on opposite sides at either end. This not only prevents the handpieces from rolling on the pin or bolt 51 but gives the handpiece an angular position with respect to the plane of the shoulder piece as shown in Figures 11 and 12, which is an advantage in handling the crutches. The pins or bolts 51 are installed through the uprights of the crutch and the handpiece in the customary straight position. The right and left handpieces are notched the same but on opposite sides. When viewed from above, as shown in Figure 12, it can be seen that the handpiece is set obliquely in relation to the two uprights of the crutch. The oblique angular cuts 52 at the ends do not extend all the way across, but lips 53 are left to extend out over but flush against opposite sides of the crutch uprights, as can be seen by the cross section through the uprights in Figure 12, thus giving the handpiece an angular twist on the horizontal plane that results in a more comfortable positioning of the hand and forearm in using a full length crutch. It brings the rear of the handpiece out under the heel of the hand, and the triangular contour provides greater area on the top side where the weight is borne.

It is to be understood that the preferred form of my invention has been shown and described herein, and that various details of construction may be varied through a wide range without departing from the principle of this invention.

I claim:

1. A crutch comprising a pair of generally parallel upright members converging at their lower ends, a socket member embracing the lower ends of said upright members, said socket member having a resilient foot for engaging the ground, a hand grip member extending between and connecting said upright members intermediate their ends, a bolt passing lengthwise through said hand grip member and transversely through said upright members and having means at its end engaging the outer sides of the latter, the longitudinal axes of said bolt and hand grip members making a slight angle with each other with respect to the vertical plane of symmetry and a headpiece connecting the upper ends of said upright members, the longitudinal axis of each headpiece being in the same vertical plane as the axis of said bolt, whereby said longitudinal axes of the headpiece and hand grip member make a slight angle with each other with reference to said vertical plane of symmetry.

2. A crutch comprising divided uprights; a headpiece removably secured to the top of said uprights; a triangularly shaped handpiece set horizontally between said uprights, said handpiece being angularly notched to provide a flange on opposite sides at each end of said handpiece to extend out over opposite sides of each of said divided uprights; and a shock absorbing device removably attached to the base of said divided uprights.

3. A crutch comprising divided uprights, a shock absorbing device adjustably secured at the base of said uprights, a headpiece removably secured to the top of said uprights, said headpiece having vertically parallel sides and ends, a cushion having vertically parallel sides and ends prefabricated to fit smoothly over said headpiece; a cover having vertically parallel sides and ends prefabricated to fit smoothly over said cushion and headpiece, said cover having elongated sides adapted to extend under the base of said headpiece; means for fastening said sides of said cover together under said base of said headpiece to hold said cushion in position, and a handpiece adapted to be set horizontally between said uprights in obliquely angular position with respect to the plane of said headpiece to cooperate with said headpiece to adjust the position of the crutch with respect to the armpit of the user.

4. In a crutch construction, a shock absorbing device comprising a tubular housing having one end of square formation to receive the base of divided crutch uprights; a tubular shaft interiorly threaded at the top end adapted to move slidably within the lower end of said housing; a threaded screw-in flanged collar in the top end of said shaft; a silencing washer between said collar and the rim of said shaft, said washer projecting circumferentially beyond said rim; a hub-like, flanged, free-floating bearing of permanent self-lubricating material having a lower part adapted to ride freely inside the inner dimension of said collar and an upper part adapted to fit tightly inside the inner dimension of one end of a compression coil spring; a spring cap guide and stem, the outer dimension of said cap guide being adapted to fit closely inside said tubular housing, and said cap guide having a lower part adapted to fit tightly inside the inner dimension of the end of said coil spring opposite said collar, said stem being of sufficient length to extend from said cap guide through said free-floating bearing at the lower end of said coil spring to keep said spring centrally stabilized; separately spaced self-lubricating bearings press installed on the inner wall of said tubular housing below said screw-in collar to reduce the friction between said housing and said shaft and limiting the relative outward movement of the shaft; and a threaded plug inside the lower end of said threaded portion of said shaft adapted to stop against said cap guide stem for limiting the relative inward movement of said shaft, thereby positively controlling the movement of said shock absorbing mechanism in both directions.

5. In a crutch construction having uprights, a shock absorbing device removably attachable to said uprights comprising a tubular housing, a shaft having its upper portion interiorly threaded adapted to move slidably within said housing, a collar adapted to screw into the top end of said shaft, a washer between said collar and the rim of said shaft, said washer being larger than said rim circumferentially; a compression coil spring; a spring cap guide having an upper part adapted to fit inside the inner dimension of said tubular housing and a lower part adapted to fit closely inside the inner dimension of one end of said coil spring; a spring bearing having a central bore, a lower part adapted to ride freely inside the inner dimension of said collar, and an upper part adapted to fit closely inside the inner dimension of the end of said coil spring opposite said spring cap guide; a guide stem on said spring cap guide adapted to extend through the central bore of said spring bearing to stabilize said coil spring; shaft bearings press installed in said housing through which said shaft is slidable, and a threaded stop plug in the threaded portion of said shaft.

6. An adjustable crutch having a pair of spaced uprights converging at their lower ends to embrace a cushioning device, transverse securing means passing through said uprights and cushioning device to secure them in adjusted relationship, and a tubular housing for said cushioning device, said housing having a series of spaced openings in opposite side walls in transverse alinement adapted to receive such of the transverse securing means as correspond to a desired adjustment of the length of the crutch, said cushioning device comprising a rotatable member provided with an adjusting screw cooperating with a threaded member controlling the position of an adjustable spring seat, a second spring seat slidable with respect to said tubular housing and mounted on a telescoping member slidable in said housing and projecting from the lower end thereof to engage the ground, said rotatable member having at least one elongated opening through it transversely to receive said transverse securing means in whatever openings said securing means may be positioned, whereby said securing means also serve to retain said rotatable member in adjusted position.

7. In a crutch having a pair of spaced uprights, a triangularly shaped handpiece, the three sides of said handpiece being slightly rounded convexly, and being notched angularly at either end on opposite sides to provide flanges, and said flanges being adapted to extend out over and flush against opposite sides of said spaced uprights to give said handpiece an angular twist relative to the principal plane of said crutch.

8. A crutch construction comprising a pair of uprights, a tension control and shock absorbing device adapted to be removably attached to said uprights, said tension control comprising a tubular housing interiorly threaded at the top, and provided with openings arranged in spaced series on opposite sides of the upper portion of said housing; a divided stem in said housing converging to a single threaded portion at the top and having a base secured to its lower ends; a threaded screw-in cap adapted to be screwed into the top of said housing having a central threaded bore through which said single threaded portion of said divided stem extends; lock nuts on said threaded portion above and below said screw-in cap to secure said divided stem in raised or lowered position; openings in each of said crutch uprights adapted to be aligned with said openings in said tubular housing at selected intervals to raise or lower said tubular housing in relation to said uprights, and bolts adapted to pass through said selected openings in said tubular housing and said openings in said crutch uprights to secure said tubular housing in selected position in relation to said crutch uprights; a shaft having its upper portion interiorly threaded adapted to move slidably in the lower end of said housing, a collar adapted to screw into the top end of said shaft and a silencing washer between said collar and the rim of said shaft; a coil spring; a spring cap guide, a lower part of said spring cap guide being adapted to fit closely inside the inner dimension of the one end of said coil spring, said spring cap guide having an upper part adapted to fit inside the inner dimension of said tubular housing contiguous to said base of said divided stem, said base and spring cap guide being adapted to cooperate to deflect said spring when said divided stem is turned; a bearing having a central bore, an upper part adapted to fit closely inside the inner dimension of the end of said coil spring opposite said spring cap guide and a lower part adapted to ride freely inside the inner dimension of said collar in the top of said shaft; a guide stem on said spring cap guide adapted to extend inside said coil spring through the central bore of said bearing, and self-lubricating bearings press-installed on the inner walls of the lower end of said housing through which said slidable shaft is freely movable, whereby the length of said crutch and the tension of said spring are both adjustable.

9. A pair of crutches each of which comprises divided uprights, a shock absorbing device removably secured to the base of said uprights; a head piece removably secured to the top of said uprights; said headpiece having a transversely convex lengthwise concave top and four vertical oppositely parallel walls, the sidewalls being longer than the end walls; a resilient cushion of generally the same contours as said headpiece, prefabricated to fit firmly over said headpiece, said cushion having equally long sidewalls and endwalls; said sidewalls and endwalls also being vertically parallel, and said sidewalls and endwalls being less thick than said top of said cushion but of sufficient thickness to cushion said sidewalls and endwalls of said headpiece; a pliable cover, having vertically parallel sidewalls and endwalls, adapted to fit smoothly over said cushion and said headpiece, the hemline of said cover being shaped to curve in and downward from the ends on both sides, to form elongated flaps to cover the elongated sidewalls of said cushion, extend under the base of said headpiece, and fit closely between said divided uprights of said crutch; means for fastening said flaps together underneath said base of said headpiece to hold said cushion and said cover in position; and a handpiece adapted to be set horizontally between said uprights in an obliquely angular position relative to the plane of said headpiece, the direction of said oblique angle being opposite for the right and left crutches, said handpiece being adapted to cooperate with said headpiece to control the position of said crutch, with respect to the hand and armpit of the user.

10. In a crutch having a pair of spaced uprights, a handpiece somewhat triangularly shaped in cross sectional contour, the three sides of said triangle being slightly rounded convexly and the ends of said handpiece being angularly cut so that when assembled said handpiece rests horizontally level between said uprights but in an obliquely angular position in relation to the general vertical plane of the crutch, said angle being of the same degree but in opposite directions in right and left crutchmates; a support for said handpiece installed thru said uprights and said handpiece in a straight forward position; flanges on opposite sides of opposite ends at said angular end cuts, said flanges being adapted to extend out over and flush against their respective uprights on opposite sides to prevent said handpiece from rolling on the support; said oblique angle of said handpiece intersecting the vertical plane of said crutch at approximately the central point to provide that when the crutch is in the proper hand, it is in the correct position whichever end of the handpiece is forward.

References Cited in the file of this patent

UNITED STATES PATENTS

| 1,509,778 | Raymond | Sept. 23, 1924 |
| 1,580,295 | Glowacki | Apr. 13, 1926 |
| 2,174,588 | Manzeck | Oct. 3, 1939 |
| 2,568,654 | Neptune | Sept. 18, 1951 |

FOREIGN PATENTS

| 425,676 | Great Britain | Mar. 19, 1935 |